United States Patent [19]

Simons

[11] Patent Number: 4,561,669
[45] Date of Patent: Dec. 31, 1985

[54] MOTORCYCLE FORK

[76] Inventor: Stephen W. Simons, 2570 Leghorn, Mountain View, Calif. 94043

[21] Appl. No.: 693,047

[22] Filed: Jan. 22, 1985

Related U.S. Application Data

[63] Continuation of Ser. No. 454,802, Dec. 30, 1982, abandoned.

[51] Int. Cl.$^4$ .............................................. B62K 25/05
[52] U.S. Cl. .................................... 280/276; 180/219
[58] Field of Search .............. 280/276, 275, 277, 668; 180/219

[56] References Cited

FOREIGN PATENT DOCUMENTS

| 910751 | 5/1954 | Fed. Rep. of Germany | 280/276 |
|---|---|---|---|
| 2721121 | 11/1977 | Fed. Rep. of Germany | 280/276 |
| 1081066 | 12/1954 | France | 280/276 |
| 535509 | 11/1955 | Italy | 280/276 |

Primary Examiner—John A. Pekar
Attorney, Agent, or Firm—Limbach, Limbach & Sutton

[57] ABSTRACT

The subject invention relates to a new and improved front fork design for a motorcycle. More particularly, a light weight telescopic front wheel fork assembly is disclosed which provides low friction, high quality damping characteristics and no axle overhang.

10 Claims, 10 Drawing Figures

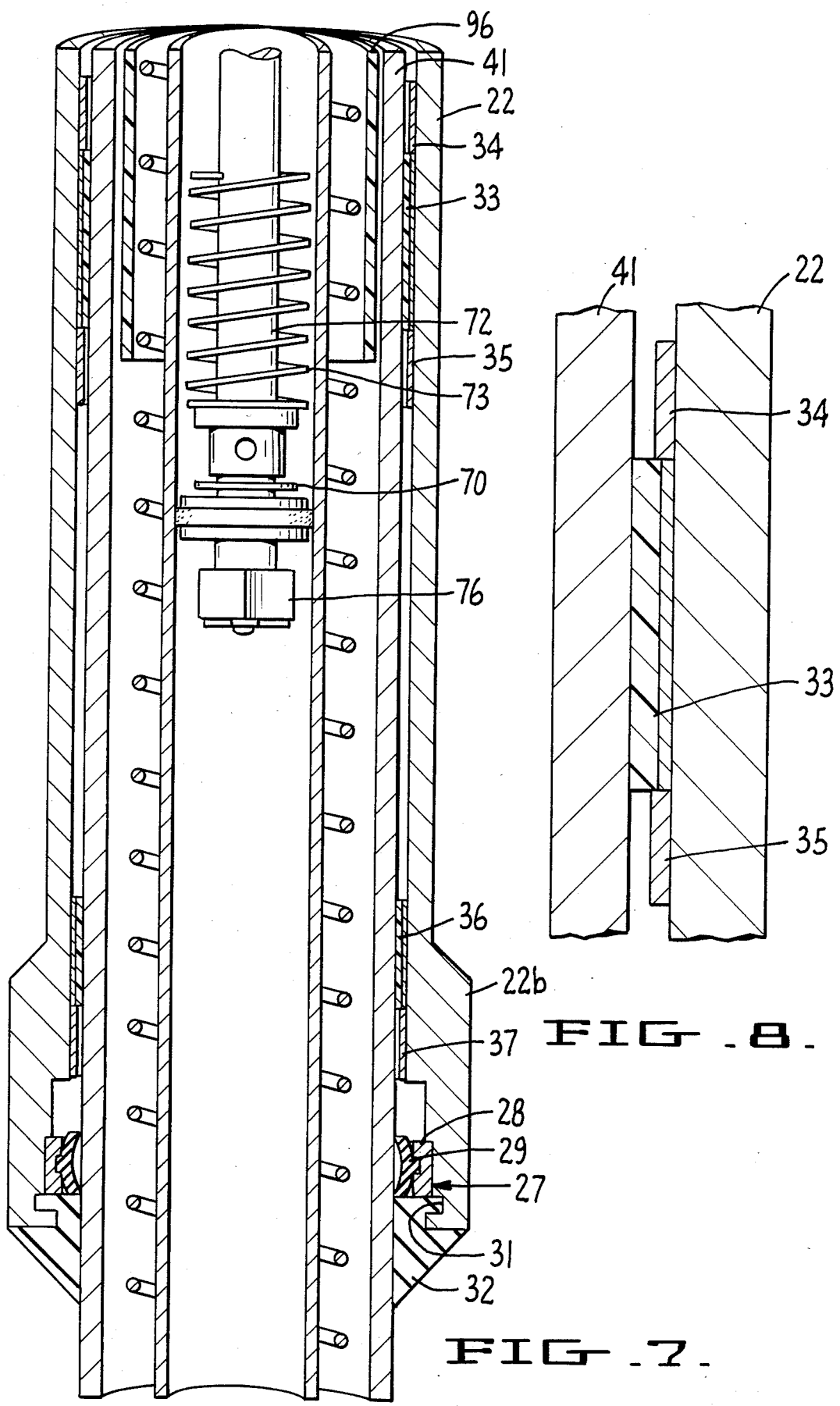

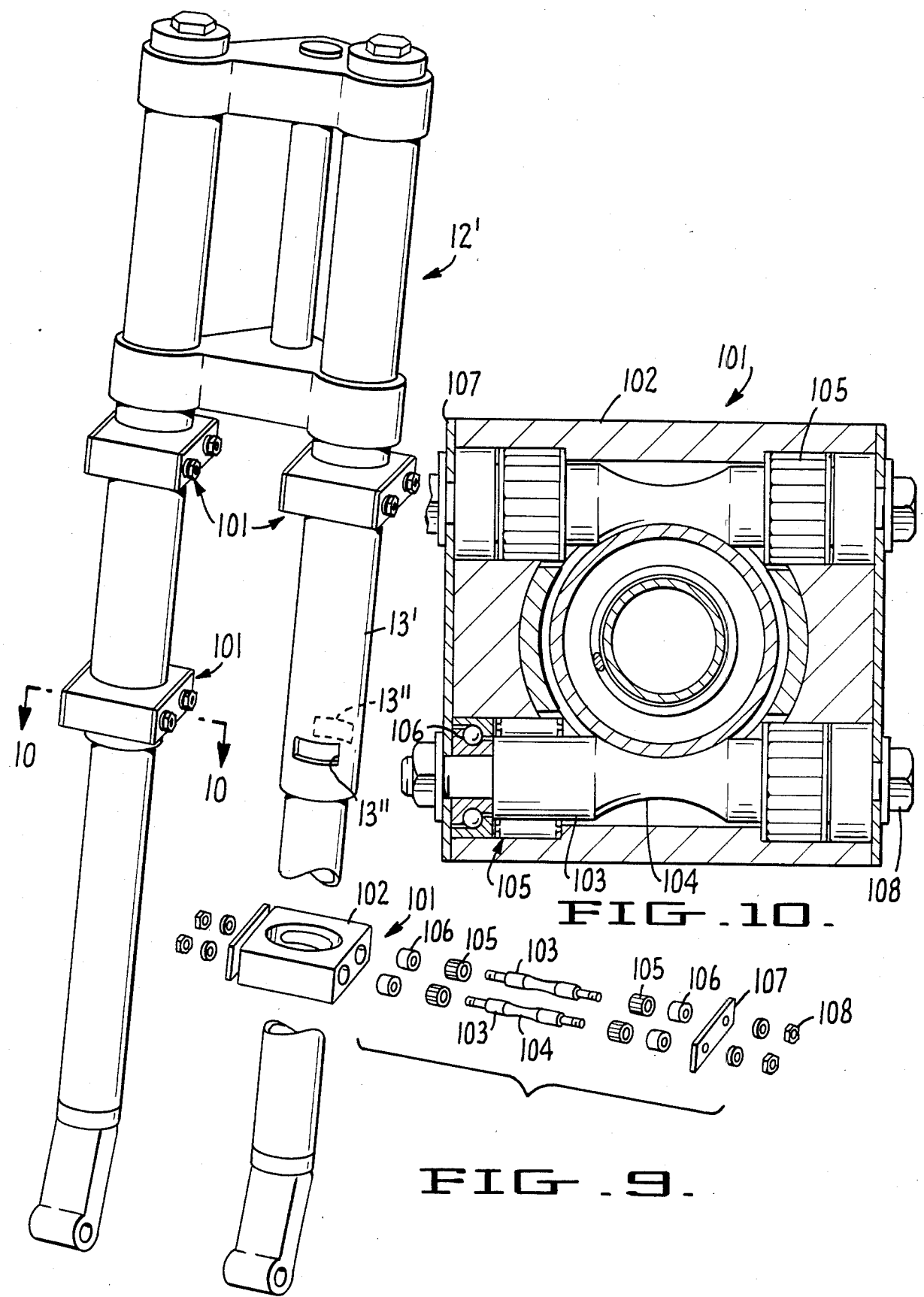

MOTORCYCLE FORK

This application is a continuation of Ser. No. 454,802 filed Dec. 30, 1982, now abandoned.

TECHNICAL FIELD

The present invention relates in general to telescopic front forks for motorcycles.

BACKGROUND ART

In the past motorcycle front forks have been constructed using telescopic fork tubes running from a pair of triple clamps to the front wheel axle on either side of the front wheel. Most front forks have been constructed using the outer of the two tubes mounted in the lower position. This construction gained great popularity due to its compatiblity with a simple damping system and low cost of manufacture. As time went on there was a search for a construction allowing more travel and better rigidity. A significant improvement came when nearly all manufacturers went to a design with the axle mounted forward of the larger cylinder. This construction permitted maximum travel and overlap with a minimum distance between the axle and the top of the fork tube. The additional travel reduced the rigidity and therefore the precision of the steering characteristics of the motorcycle. Also the bottom of the fork hit the ground often if the motorcycle was ridden in ruts or around the right type of corner.

The object of the present invention is to provide a lightweight, highly rigid fork with low friction, high quality damping characteristics and no axle overhang.

One feature of the present invention is the provision of a telescopic design with the large diameter tube mounted in the triple clamps and the small diameter tube attached to the axle wherein the inner tube is allowed to slide up through the outer tube until it hits the fork cap at the top of the outer tube.

In accordance with this object of the present invention mounting of the larger diameter tube in the triple clamp produces a higher strength to weight ratio and therefore a greater possibility of higher rigidity. Also the length of the upper tube that is clamped between the triple clamps can be utilized for travel of the telescoping lower tube.

In accordance with another feature of the present invention an upper bushing is provided in the upper tube held by bushing retainers and reduces distortion that would prevent the lower inner fork tube from sliding freely through the upper outer fork tube.

In accordance with another feature and advantage of the present invention the front axle is placed in front of the center line of the fork to reduce the moment of inertia of the fork assembly.

In accordance with still another aspect of the present invention a small outside diameter, primary extension spring is housd in a spring cylinder which retains the spring perfectly straight at all times and thereby avoiding snaking of the spring and maintaining the weight of the fork member low because of the smaller diameter spring.

In accordance with still another aspect of the present invention a bottoming piston is provided which has a precise outside diameter which operates in conjunction with a hollow cylindrical damper bushing which slides on a damper rod and with an enlarged diameter opening at the upper end of the bushing with a very precise inside diameter. In accordance with this aspect of the present invention when the fork assembly is under compression and extension a precise clearance between the rod and the bushing allows a small amount of oil to fill the enlarged bottom out chamber of the damper bushing housing. When the system is just short of full travel the bottoming piston starts into the bottom out chamber and displaces oil which is forced through the clearance between the damper rod and bushing and between the bottom out piston and the damper bushing creating a heavy damping effect thereby cushioning any metal-to-metal bottoming.

In accordance with another apsect of the present invention, the fork member includes at least one, and preferably a pair, of spaced-apart bearing housings secured to the outer fork tube with the outer fork tube opening into said housing on opposite sides of said outer fork tube. A pair of rollermembers is mounted in the housing on opposite sides of the outer fork tube and extending through the opening in the outer fork tube, each of said roller members having a concave surface with the axis of said concave surface coincident with the axis of said roller member, and the concave surface engaging the exterior surface of the inner fork tube.

These features and advantages of the present invention will become more apparent upon a perusal of the following specification taken in conjuction with accompanying drawings wherein similar characters of reference refer to similar parts in each of the several views.

BRIEF DESCRIPTION OF THE DRAWINGS

FIG. 7 is an enlarged sectional view of a portion of the structure shown in FIG. 3 taken along line 7—7.

FIG. 8 is an enlarged sectional view showing a bushing assembly of FIG. 7.

FIG. 9 is a perspective view, partially exploded, of an alternative embodiment of the present invention.

FIG. 10 is an enlarged sectional view of a portion of the structure shown in FIG. 9 along line 10—10 in the direction of the arrows.

DETAILED DESCRIPTION OF THE DRAWINGS

Figure 1:
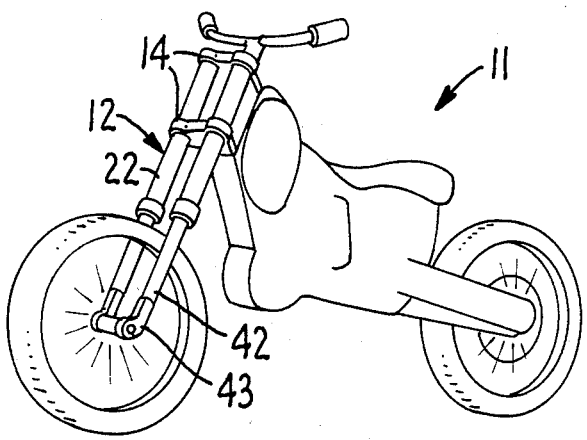
FIG. 1 is a perspective view of a motorcycle incorporating the present invention.
Figure 2:
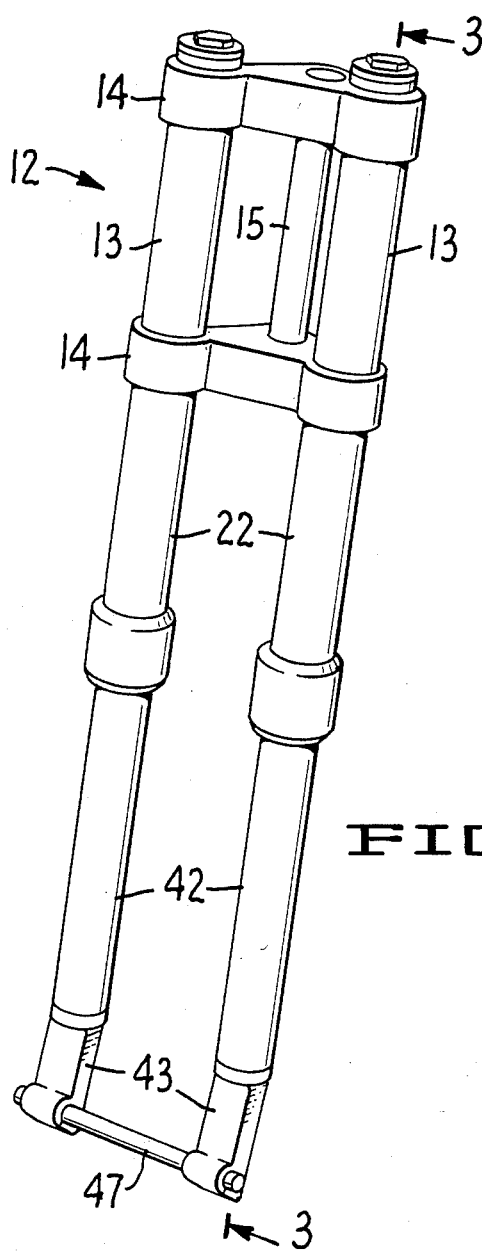
FIG. 2 is an enlarged perspective view of the fork assembly on the motorcycle shown in FIG. 1.

Referring now to the drawings with particular reference to FIGS. 1 and 2 there is a schematic illustration of a motorcycle 11 provided with a front fork assembly 12 incorporating the present invention. The assembly 12 includes a pair of front fork members 13 which are mounted at one end between a pair of spaced-apart triple clamps 14 which are mounted on a steering stem 15. Each triple clamp has clamping means for clamping to the outside upper fork tube of each front fork member.

Figure 3:
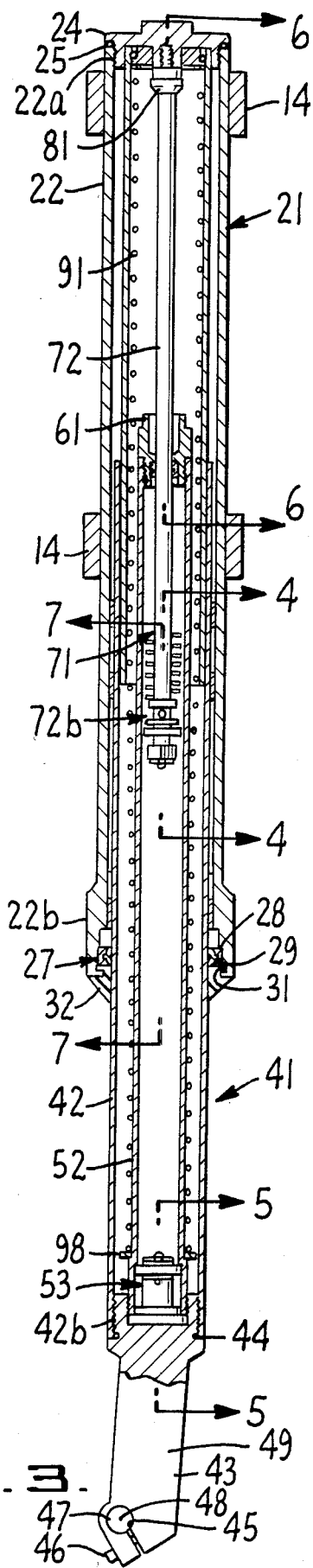
FIG. 3 is an enlarged cross-sectional view of one of the fork members shown in FIG. 2.
Figure 4:
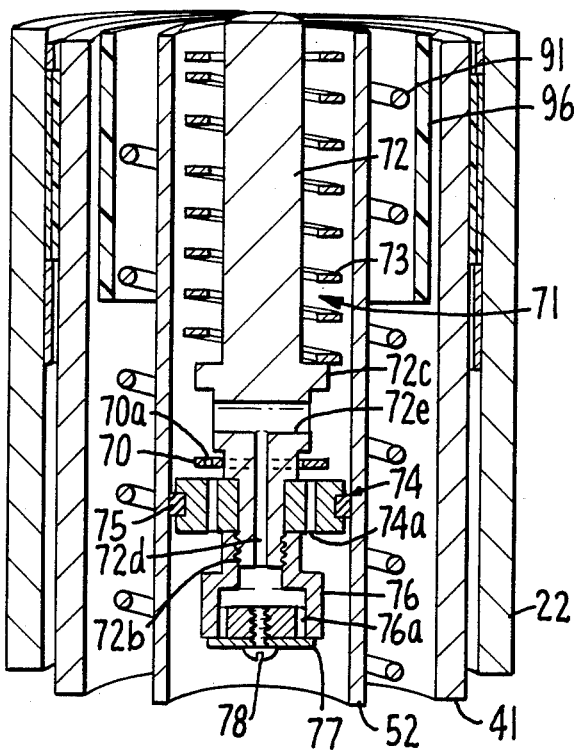
FIG. 4 is an enlarged sectional view of that portion of the structure shown in FIG. 3 delineated by 4—4.
Figure 5:
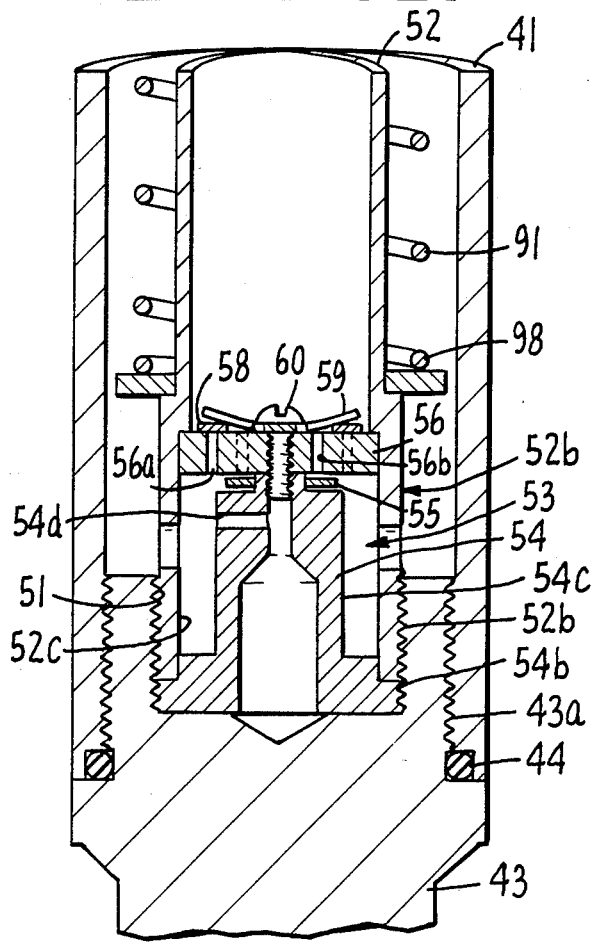
FIG. 5 is an enlarged sectional view of the portion of the structure shown in FIG. 3 delineated by 5—5.
Figure 6:
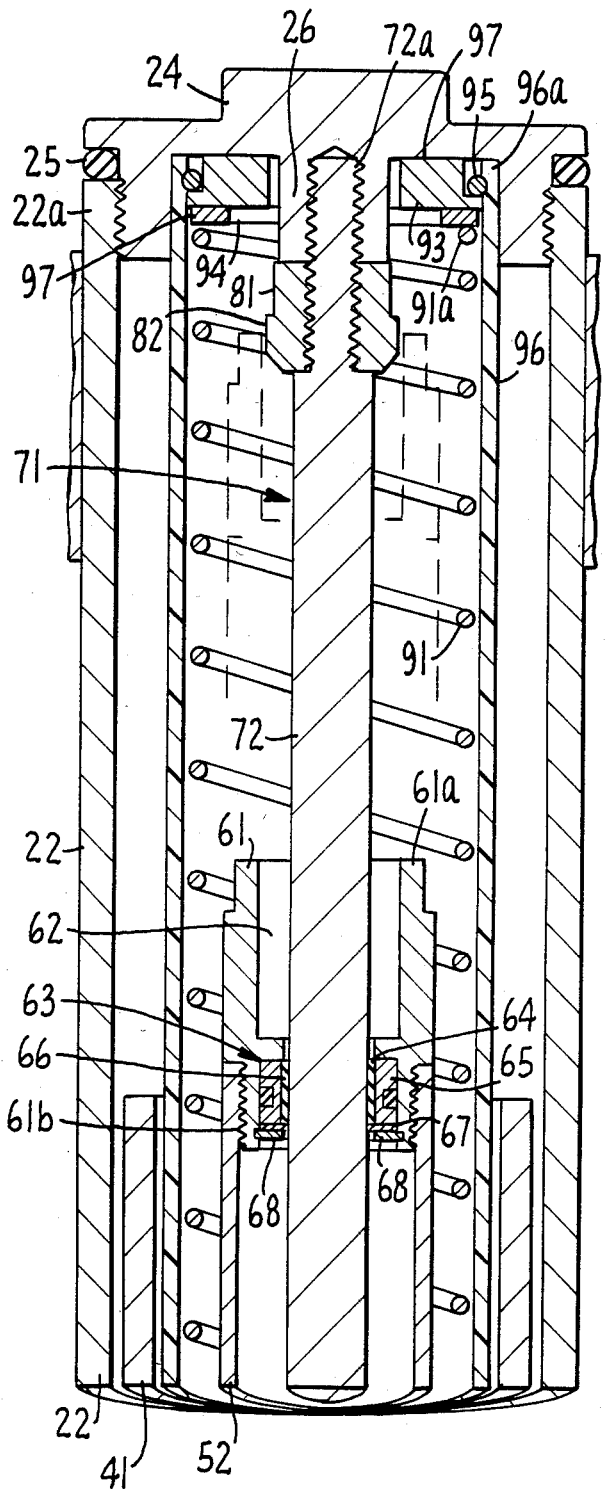
FIG. 6 is an enlarged sectional view of the structure shown in FIG. 3 delineated by lines 6—6 and with the parts shifted to the position approaching complete compression of the assembly and bottoming out.

Referring now to FIGS. 3–5 each front fork member 13 includes a upper outer fork tube assembly 21 and a lower fork tube assembly 41. The outer fork tube assembly 21 includes the upper outer fork tube 22 such as of aluminum into the upper end 22a of which is secured such as by screw threads, a fork cap 24 which includes means such as a rubber O-ring 25 creating an oil seal between the cap 24 and the fork tube 22. The fork cap 24 includes an internally threaded central portion 26 projecting axially into the upper fork tube 22 for attachment to a piston damper rod 72 to be described in greater detail below.

The upper fork tube 22 has an enlarged diameter lower end 22b in which is inserted, such as by a pressfit, a fork seal 27 for creating a seal between the upper fork tube assembly 21 and lower fork tube assembly 41. Toward the lowermost portion of the lower end 22b of the upper fork tube 22 an annular groove 31 is provided for receiving a fork wiper ring 32. Inside the upper fork tube 22 are a pair of bushings 33 and 36. The upper bushing 33 is held in place by a pair of bushing retaining rings 34 and 35 positioned on either side of the bushing 33. Adjacent the enlarged diameter lower end 22b, the lower bushing 36 is held in place by a single retaining ring 37 thereabove. In the preferred embodiment the bushing retaining rings 34, 35 and 37 are steel and the bushings 33 and 36 are Garlock DU material.

The lower fork tube assembly 41 includes the lower inner fork tube 42, such as of alloy steel, which is connected such as by threads at its lower end 42b to an axial clamp member 43, such as of aluminum, and with an O-ring 44 creating a seal between the lower fork tube 42 and the clamp member 43. The clamp member 43 has a transverse hollow cylinder opening 45 for clamping the axle 47 of the motorcycle using axle clamping bolts 46. The longitudinal axis 48 of the cylindrical opening 45 is offset forwardly of the longitudinal axis 49 of the fork member.

The upper end 43a of the axial clamp member 43 is provided with a hollow cylindrical recess 51 internally threaded at 52 for attachment to the lower end 52b of a damper piston tube 52. The lower end 52b of the damper piston tube 52 is provided with an enlarged diameter bore 52c for receiving a base valve assembly 53.

The base valve assembly 53 includes a compression stop body 54 slidably inserted in the enlarged diameter bore 52c of the damper piston tube 52 with the lower enlarged diameter end 54b abutting the lower end of the damper piston tube 52. Mounted sequentially at the upper end 54a of the compression stop body 54 are a damping washer 55, then a base valve 56 with a plurality, such as eight, of circumferentially spaced-apart valve openings 56a, a plurality such as four of inwardly spaced valve openings 56b, and a replenishment washer 58 and a replenishment spring 59 all held in place against the compression stop body 54 by a hollow bleed screw 60. A reduced diameter bore 54c in the main portion of the compression stop body 54 is provided with communication port 54d to the upper ends of the valve openings 56a. The damping washer 55 is movable longitudinally to cover the valve openings 56b, and the replenishment washer 58 is held in place by the spring 59 covering the valve openings 56a.

Into the upper end 52a of the damper piston tube 52 is screwed a hollow cylindrical damper bushing housing 61 which both serves as a bushing for the piston damper rod 72 and housing for the bottoming piston 81 to be described in greater detail below. The upper end 61a of the damper bushing housing 61 is provided with an enlarged diameter recess or bottoming out chamber 62. At the lower end 61b of the damper bushing housing 61 a bushing assembly 63 is provided for passing and supporting the damper rod 72. The bushing assembly 62 includes an O-ring 64 outside a bushing in the form of an annular metal ring 65 holding an inner annular bushing member 66 such as of Teflon. The bushing assembly 63 is held in place by a retaining washer 67 and a spiral lock retaining ring 68 which engages an annular groove at the lower end 61b of the damper bushing housing 61.

A damper rod assembly 71 includes a damper rod 72 threaded at its upper end 72a for engagement in the central threaded portion 26 of the fork cap 24. At the lower end 72b the damper rod 72 is provided with an annular ridge 72c for holding a top out spring 73 which is captured between the annular ridge 72c and the damper bushing housing 61. A valve washer 70 with oil bleed holes 70a of designated size is held on to the lower end 72b of the damper rod 72 adjacent the upper side of a piston 74 by an extension valve body 76 provided with a series of passages 76a therethrough which can be covered by a movable damping washer 77 held in place on the extension valve body by a screw 78. The piston 74 is provided with a piston ring 75, such as of Teflon and a series of parts 74a is provided in the piston 74 with the valve washer 70 movable longitudinally to cover up the ports 74a. The passages 76a communicate with a bore 72d extending longitudinally into the lower end 72b of damper rod 72, and the bore 72d terminates in a transverse bore 72e through the damper rod 72.

A bottoming piston 81 is provided at the upper end of 72a the damper rod 72 such as by screwing on to the threads at the upper end thereof. The bottoming piston has a external cylindrical surface 82 of precise relationship for a sliding fit within the enlarged diameter recess 62 at the upper end 61a of the damper bushing housing 61. In the preferred embodiment of the fork member assembly in accordance with the present invention the clearance between the cylindrical surface 82 of the bottoming piston 81 and the surface of the enlarged diameter recess 62 of the damper bushing housing 61 is about 1 to 2 thousandths of an inch.

The primary extension spring 91 for extending the upper and lower fork tube assemblies 21 and 41 is positioned outside of the damper piston tube 52 but inside the fork tubes 22 and 42. The inside diameter of the extension spring 91 is adapted to slide over the damper piston tube 52 and the outside diameter of the spring is substantially less than the inside diameter of the inner fork tube 42. The upper end 91a of the extension spring 91 is seated on the longitudinal hollow cylindrical extension 94 of a spring tube centering washer 93 which fits over the central projecting portion 26 of the fork cap 24. The centering washer 93 is captured by a retaining ring 95 in the upper end 96a of a lightweight spring retaining tube 96 such as of Lexan. The spring retaining tube 96 has an inside diameter adapted to slide over the extension spring 91 and prevent the spring from snaking during compression. A hollow cylindrical preload spacer 97 can be provided between the centering washer 93 and the upper end 91a of the spring 91. By using spacers of different lengths, different preload compression can be applied to the extension spring 91. The lower end 91b of the extension spring 91 engages a spring washer 98 which abuts the enlarged diameter portion around the enlarged diameter bore 52c at the lower end 52b of the damper piston tube 52.

The damper rod 72 is moved in and out of the damper piston tube 52 as the suspension is cycled. This activates the damping system. The damper piston tube 52 provides a pressure tight bore for the system to operate. The extension valve assembly 70-78 controls the extension damping. The base valve assembly 53 controls the compression damping and keeps the damping system full of oil. The bottom out assembly which consisting of the damper bushing 63, damper rod 72, damper bushing housing 61 and bottoming piston 81 cushions against any metal-to-metal bottoming of the lower fork tube 42 against the fork cap 24 at the end of the compression of the inner and outer fork tube assemblies 21 and 41. The damper rod 72 has a very precise outside diameter and the damper bushing 63 has a very precise inside diameter. The result is that under compression and extension a precise clearance between the rod 72 and the bushing 63 allows a small amount of oil to fill the bottoming out chamber or enlarged diameter recess 62 of the damper bushing housing 61. When the system is a short distance, such as one half inch, from full travel, the bottom piston 81 begins movement into the bottoming out chamber or enlarged diameter recess 62 of the damper bushing housing 61, and as the piston 81 moves further it displaces oil which is forced through the clearance between the damper rod 72 and bushing 63 and between the bottom out piston 81 and the damper bushing housing 61 creating a heavy damping effect.

The damping rod assembly 70-78 has two functions. In compression it does not do any damping but the valve washer 70 opens up allowing oil to flow through the ports 74a of the piston cylinder. On return, or rebound or extension the valve washer 70 closes and you have damping through the bleed holes 70a and displacement of oil through the bores 72e and 72d past the damping washer 77.

In the base valve assembly 53 during compression oil displaced by the damper rod 72 flows through the bleed screw 60 and the inner valve openings 56b. Upon extension the replenishment washer 58 opens and allows oil to flow through the outer valve openings 56a.

The large diameter outer fork tube 22 mounted at the triple clamps 14 and with the bushings 33 and 36 provide a stronger support structure where the fork assembly is connected to the triple clamps.

A large extension spring inside the assembly would tremendously increase the weight of the entire assembly. The smaller diameter extension spring 91 avoids unnecessary weight and the spring tube 96 avoids snaking of the spring 91. In a preferred embodiment the spring is 30 inches long and the fork has a travel of 12 inches so the spring with a spring rate of 18 lbs./inch is compressed to 18 inches. The top out spring 73 produces damping against metal-to-metal contact at full extension of the fork assembly.

Referring now to FIGS. 9 and 10 of the drawing, there is shown an alternative embodiment of the present invention wherein the front fork assembly 12' includes a pair of bearing assemblies 101 spaced apart along the length of each of the front forks 13'.

Each of the front forks 13' at the location for bearing assembly 101 is provided with a pair of spaced-apart openings 13" on the opposite sides of the outer fork tube 22'.

The bearing assembly 101 includes a bearing assembly housing 102 that fits over the outer fork tube 22' at the openings 13" and includes a pair of roller members 103 mounted in space-apart relation within the housing 102 for oroviding a bearing surface against the inner fork tube 42'. Each roller member 103 includes a concave bearing surface 104 which has an axis coincident with the axis of the roller member 103 and for engaging the outer surface of the inner fork tube 42'. The roller members 103 are rotatably supported with needle bearings 105 and Torrington bearings 106 within the housing 102 and mounted in end plates 107 by nuts 108 threated on the ends of the roller members.

The spaced-apart bearing assemblies provide minimal starting friction when the fork assembly is brought into play by shock engagement of the front wheel with the earth after the cycle has become airborne. Typically, in those circumstances, torque is applied at the front axle which results in increasing the break-away friction between the inner and outer fork tubes of the fork assembly. It has been found that the break-away friction is reduced by approximately two-thirds when the bearing assemblies, as shown in FIGS. 9 and 10, are utilized in lieu of the bushing assemblies used in the fork assemblies of FIGS. 1-8.

I claim:

1. A motorcycle front wheel fork assembly comprising:
   a pair of fork members adapted to be connected at one end to the front wheel axle of the motorcycle,
   a pair of triple clamps adapted for mounting the other end of the fork members to the steering stem and hanlde bar of the motorcycle,
   each of said fork members comprising:
      an upper outer fork tube adapted to be clamped by said triple clamps and a lower inner fork tube with the other end thereof telescopically mounted within said outer fork tube,
      an axle clamp member connected to the lower exposed end of said inner fork tube and adapted to clamp on the front axle of the motorcycle,
      an extension spring biasing said fork tubes in extended telescopic relationship,
      a damper piston tube connected at the lower end thereof to said axle clamp member and slidably receiving therewithin a piston on one end of a damper rod, the other end of said rod connected to the upper end of said outer fork tube, and
      a telescoping damping assembly comprising a hollow cylindrical damper bushing housing connected at its lower end to the other end of said damper piston tube and slidably passing said damper rod and a bottoming piston connected at the upper end of said outer fork tube and having an outer cylindrical surface,
      said damper bushing housing having an enlarged diameter recess at its upper end for closely receiving said cylindrical surface of said bottoming piston.

2. A fork member for a telescopic motorcycle front wheel fork assembly having a pair of fork members, each having two ends and each having a first and a second fork mount for mounting between the front wheel axle and a pair of triple clamps adapted for mounting on the steering stem of the motorcycle, said fork member comprising
   an outer fork tube adapted to be connected to one of said fork mounts, an inner fork tube telescopically mounted within said outer fork tube and adapted to be connected to the other of said fork mounts, means for spring biasing said fork tubes in extended telescopic relationship whereby the fork tubes can telescope together, a damper piston tube connected at one end to one of said fork ends and slidably receiving therewithin a piston on one end of a damper rod, the other end of said rod connected to said other fork end, and a telescoping damping assembly at the other end of said damper piston tube and said one fork end for acting as a heavy damping mechanism on compression thereby cushioning any metal-to-metal bottoming, said telescoping damping assembly including a bottoming piston having an outside cylindrical surface, and a hollow cylindrical damper bushing housing having an enlarged diameter recess at its upper end for closely receiving said cylindrical surface of said bottoming piston, one of said bottoming piston and said damper bushing housing mounted at said other end of said damper piston tube and the other of said bottoming piston and said damper bushing housing mounted at said one fork end.

3. A fork member for a telescopic motorcycle wheel fork assembly having a pair of fork members each having two ends and each having a first and a second fork mount for mounting between the front wheel axle and a pair of triple clamps adapted for mounting on the steering stem of the motorcycle, said fork member comprising an outer fork tube adapted to be connected to one of said fork mounts, an inner fork tube telescopically mounted within said outer fork tube and adapted to be connected to the other of said fork mounts, means for spring biasing said fork tubes in extended telescopic relationship whereby the fork tubes can telescope together, a damper piston tube connected at one end to one of said fork ends and slidably receiving therewithin a piston on one end of a damper rod, the other end of said rod connected to said other fork end, a telescoping damping assembly at the other end of said damper piston tube and said one fork end for acting as a heavy damping mechanism on compression thereby cushioning any metal-to-metal bottoming, a primary extension spring having an inside diameter adapted to slide over said damper piston tube and an outside diameter substantially less than the inside diameter of said inner fork tube, and a spring retaining tube having an outside diameter substantially less than the inside diameter of said inner fork tube and an inside diameter adapted to slide over said extension spring and adapted to prevent said spring from snaking during compression, said extension spring extending from adjacent said one end of said damper piston tube to adjacent said other fork end for holding and returning said fork tubes in extended telescopic relationship.

4. A fork member for a telescopic motorcycle front wheel fork assembly having a pair of fork members for mounting between the front wheel axle and a pair of triple clamps adapted for mounting on the steering stem of the motorcycle, said fork member comprising an upper outer fork tube adapted to be clamped by said triple clamps, a lower inner fork tube telescopically mounted within said outer fork tube, an axle clamp member connected to the lower exposed end of said inner fork tube and adapted to clamp on the front axle of the motorcycle, means for spring biasing said fork tubes in extended telescopic relationship whereby the fork tubes can telescope together, a damper piston tube connected at one end to said axle clamp member and slidably receiving therewithin a piston on one end of a damper rod, the other end of said rod connected to the upper end of said outer fork tube, and a telescoping damping assembly at the other end of said damper piston tube and said upper end of said outer fork tube for acting as a heavy damping mechanism on compression thereby cushioning any metal-to-metal bottoming, said telescoping damping assembly including a hollow cylindrical damper bushing housing connected at its lower end to the other end of said damper piston tube and slidably passing said damper rod and a bottoming piston connected to the upper end of said outer fork tube and having an outside cylindrical surface, said damper bushing housing having an enlarged diameter recess at its upper end for closely receiving said cylindrical surface of said bottoming piston.

5. The fork member of claim 4 wherein said axle clamp member includes a transverse hollow cylindrical means for engaging the front axle of a motorcycle with the axis of said hollow cylindrical means forward of the longitudinal axis of said fork tubes thereby placing the front axis of the motorcycle forward of the longitudinal axis of said fork member.

6. A fork member for a telescopic motorcycle front wheel fork assembly having a pair of fork members for mounting between the front wheel axle and a pair of triple clamps adapted for mounting on the steering stem of the motorcycle, said fork member comprising an upper outer fork tube adapted to be clamped by said triple clamps, a lower inner fork tube telescopically mounted within said outer fork tube, an axle clamp member connected to the lower exposed end of said inner fork tube and adapted to clamp on the front axle of the motorcycle, means for spring biasing said fork tubes in extended telescopic relationship whereby the fork tubes can telescope together, at least one bearing assembly comprising a bearing housing secured to said outer fork tube with said outer fork tube opening into said housing on opposite sides of said outer fork tube, a pair of roller members mounted in said housing on opposite sides of said outer fork tube and extending through the opening in said outer fork tube each of said roller members having a concave surface engaging the exterior surface of said inner fork tube for rolling engagement of said roller members with said inner fork tube during telescopic movement of said inner fork tube in said outer fork tube.

7. The fork member of claim 6 including a pair of said bearing assemblies spaced apart along the length of said outer fork tube.

8. A fork member for a telescopic motorcycle wheel fork assembly having a pair of fork members for mounting between the front wheel axle and a pair of triple clamps adapted for mounting on the steering stem of the motorcycle, said fork member comprising an upper outer fork tube adapted to be clamped by said triple clamps, a lower inner fork tube telescopically mounted within said outer fork tube, an axle clamp member connected to the lower exposed end of said inner fork tube and adapted to clamp on the front axle of the motorcycle, means for spring biasing said fork tubes in extending telescopic relationship whereby the fork tubes can telescope together, a damper piston tube connected at one end to said axle clamp member and slidably receiving therewithin a piston on one end of a damper rod, the other end of said rod connected to the upper end of said outer fork tube, a telescoping damping assembly at the other end of said damper piston tube and said upper end of said outer fork tube for acting as a heavy damping mechanism on compression thereby cushioning any metal-to-metal bottoming, a primary extension spring having an inside diameter adapted to slide over said damper piston tube and an outside diameter substantially less than the inside diameter of said inner fork tube, and a spring retaining tube having an outside diameter substantially less than the inside diameter of said inner fork tube and an inside diameter adapted to slide over said extension spring and adapted to prevent said spring from snaking during compression, said extension spring extending from adjacent said one end of said damper piston tube to adjacent the upper end of said outer fork tube for holding and returning said fork tubes in extended telescopic relationship.

9. A fork member for a telescopic motorcycle wheel fork assembly having a pair of fork members for mounting between the front wheel axle and a pair of triple clamps adapted for mounting on the steering stem of the motorcycle, said fork member comprising an upper outer fork tube adapted to be clamped by said triple clamps, a lower inner fork tube telescopically mounted within said outer fork tube, an axle clamp member connected to the lower exposed end of said inner fork tube and adapted to clamp on the front axle of the motorcycle, means for spring biasing said fork tubes in extended telescopic relationship whereby the fork tubes can telescope together, a cap connected to the upper end of said outer fork tube, a damper piston tube connected at a first end to said axle clamp member within said inner fork tube, a hollow cylindrical damper bushing housing connected at its lower end to the second end of said damper piston tube, a damper rod slidable within said damper bushing housing and connected at a first end to said cap and at a second end to a piston slidably positioned within said damper piston tube, a bottoming piston connected to said damper rod adjacent the first end thereof and having an outside cylindrical surface and said damper bushing housing having at its upper end an enlarged diameter recess for receiving said cylindrical surface of said bottoming piston.

10. A motorcycle front wheel fork assembly comprising:

a pair of fork members adapted to be connected at one end to the front wheel axle of the motorcycle, a pair of triple clamps adapted for mounting the other end of the fork members to the steering stem and handle bar of the motorcycle, each of said fork members comprising:

an upper outer fork tube adapted to be clamped by said triple clamps and a lower inner fork tube with the other end thereof telescopically mounted within said outer fork tube, an axle clamp member connected to the lower exposed end of said inner fork tube and adapted to clamp on the front axle of the motorcycle, an extension spring biasing said fork tubes in extended telescopic relationship, a damper piston tube connected at the lower end thereof to said axle clamp member and slidably receiving therewithin a piston on one end of a damper rod, the other end of said rod connected to the upper end of said outer fork tube, and a telescoping damping assembly comprising a hollow cylindrical damper bushing housing connected at its lower end to the other end of said damper piston tube and slidably passing said damper rod and a bottoming piston connected at the upper end of said outer fork tube and having an outer cylindrical surface, said damper bushing housing having an enlarged diamer recess at its upper end for closely receiving said cylindrical surface of said bottoming piston, a primary extension spring having an inside diameter adapted to slide over said damper piston tube and an outside diameter substantially less than the inside diameter of said inner fork tube, a spring retaining tube having an outside diameter substantially less than the inside diameter of said inner fork tube and an inner diameter adapted to slide over said extension spring and adapted to prevent said spring from snaking during compression, and said extension spring extending from adjacent said lower end of said damper piston tube to adjacent the upper end of said outer fork tube for holding and returning said fork tubes in extended telescopic relationship.

* * * * *